(12) United States Patent
Kim et al.

(10) Patent No.: US 10,895,955 B2
(45) Date of Patent: *Jan. 19, 2021

(54) APPARATUS AND METHOD FOR GROUPING AND DISPLAYING ICONS ON A SCREEN

(71) Applicant: Samsung Electronics Co., Ltd., Suwon-si (KR)

(72) Inventors: Young-Jun Kim, Pocheon-si (KR); Youn Seog Chang, Hwaseong-si (KR); Joon Woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,535

(22) Filed: Jun. 13, 2019

(65) Prior Publication Data

US 2019/0294316 A1 Sep. 26, 2019

Related U.S. Application Data

(63) Continuation of application No. 15/218,760, filed on Jul. 25, 2016, now Pat. No. 10,365,787, which is a (Continued)

(30) Foreign Application Priority Data

Oct. 13, 2009 (KR) .................. 10-2009-0097255
Oct. 16, 2009 (KR) .................. 10-2009-0098944

(51) Int. Cl.
*G06F 3/048* (2013.01)
*G06F 3/0481* (2013.01)
(Continued)

(52) U.S. Cl.
CPC .......... *G06F 3/04817* (2013.01); *G06F 3/016* (2013.01); *G06F 3/0481* (2013.01);
(Continued)

(58) Field of Classification Search
CPC .......... H04M 2250/22; H04M 1/72544; G06F 3/0488; G06F 3/04842; G06F 3/0483
See application file for complete search history.

(56) References Cited

U.S. PATENT DOCUMENTS 5,060,135 A 10/1991 Levine et al.
5,801,699 A 9/1998 Hocker et al.
(Continued)

FOREIGN PATENT DOCUMENTS

JP 2007-328456 A 12/2007
KR 10-2004-0040743 A 5/2004
(Continued)

OTHER PUBLICATIONS

IBM Technical Disclosure Bulletin, "Adding and Removing Icons from a Multi-Icon", Mar. 1, 1993, TDB-ACC-No. N9303401, pp. 401-402.
(Continued)

*Primary Examiner* — Pei Yong Weng
(74) *Attorney, Agent, or Firm* — Jefferson IP Law, LLP

(57) ABSTRACT

A method for displaying a background screen in a mobile terminal is provided. The method includes resizing at least one of a plurality of background screens according to a first input, displaying at least one of the at least one resized background screen, detecting a second input, and transitioning among the resized background screens based on the detected second input, wherein the background screens respectively include an icon that may represent a grouping of a first icon and a second icon respectively displayed on one of the plurality of background screens.

22 Claims, 13 Drawing Sheets

Related U.S. Application Data continuation of application No. 14/321,252, filed on Jul. 1, 2014, now Pat. No. 9,423,934, which is a continuation of application No. 14/056,298, filed on Oct. 17, 2013, now Pat. No. 9,791,996, which is a continuation of application No. 12/900,715, filed on Oct. 8, 2010, now Pat. No. 8,577,419, which is a continuation of application No. 12/905,408, filed on Oct. 15, 2010, now Pat. No. 10,082,948.

(51) Int. Cl.
| | |
|---|---|
| G06F 3/0482 | (2013.01) |
| G06F 3/0488 | (2013.01) |
| G06F 3/0484 | (2013.01) |
| G06F 3/01 | (2006.01) |
| H04M 1/725 | (2006.01) |
| G06T 11/60 | (2006.01) |
| G06F 3/0483 | (2013.01) |

(52) U.S. Cl.
CPC .......... *G06F 3/0482* (2013.01); *G06F 3/0483* (2013.01); *G06F 3/0484* (2013.01); *G06F 3/0488* (2013.01); *G06F 3/04842* (2013.01); *G06T 11/60* (2013.01); *H04M 1/72544* (2013.01)

(56) References Cited

U.S. PATENT DOCUMENTS

| | | | |
|---|---|---|---|
| 5,841,435 | A | 11/1998 | Dauerer et al. |
| 6,008,809 | A | 12/1999 | Brooks |
| 6,026,409 | A | 2/2000 | Blumenthal |
| 6,211,856 | B1 | 4/2001 | Choi et al. |
| 6,469,722 | B1 | 10/2002 | Kinoe et al. |
| 6,611,291 | B1 | 4/2003 | Dow et al. |
| 6,857,106 | B1 | 2/2005 | Brouaux |
| 7,216,304 | B1 | 5/2007 | Gourdol et al. |
| 7,315,985 | B1 | 1/2008 | Gauvin et al. |
| 7,429,993 | B2 | 9/2008 | Hui |
| 7,523,405 | B2 | 4/2009 | Robertson et al. |
| 7,526,738 | B2 | 4/2009 | Ording et al. |
| 7,587,683 | B2 | 9/2009 | Ito et al. |
| 8,205,172 | B2 | 6/2012 | Wong et al. |
| 8,266,550 | B1 * | 9/2012 | Cleron ............... G06F 3/04817 715/863 |
| 8,312,660 | B1 | 11/2012 | Fujisaki |
| 8,355,698 | B2 | 1/2013 | Teng et al. |
| 8,381,129 | B2 | 2/2013 | Ohazama et al. |
| 8,392,849 | B2 | 3/2013 | Jung |
| 8,656,314 | B2 | 2/2014 | Locker et al. |
| 2002/0080180 | A1 | 6/2002 | Mander et al. |
| 2003/0179240 | A1 | 9/2003 | Gest |
| 2003/0189597 | A1 | 10/2003 | Anderson et al. |
| 2004/0266396 | A1 | 12/2004 | Henry et al. |
| 2005/0037815 | A1 | 2/2005 | Besharat et al. |
| 2005/0192924 | A1 | 9/2005 | Drucker et al. |
| 2005/0270307 | A1 | 12/2005 | Brouaux |
| 2006/0090141 | A1 | 4/2006 | Loui et al. |
| 2006/0112354 | A1 | 5/2006 | Park et al. |
| 2006/0143574 | A1 | 6/2006 | Ito et al. |
| 2007/0033537 | A1 | 2/2007 | Mander et al. |
| 2007/0042800 | A1 | 2/2007 | Tani |
| 2007/0050724 | A1 | 3/2007 | Lee et al. |
| 2007/0065044 | A1 | 3/2007 | Park et al. |
| 2007/0174785 | A1 | 7/2007 | Perttula |
| 2007/0176898 | A1 | 8/2007 | Suh |
| 2007/0288868 | A1 | 12/2007 | Rhee et al. |
| 2008/0040682 | A1 | 2/2008 | Sorenson et al. |
| 2008/0094398 | A1 | 4/2008 | Ng et al. |
| 2008/0141166 | A1 | 6/2008 | Goldberg et al. |
| 2008/0307359 | A1 | 12/2008 | Louch et al. |
| 2009/0019385 | A1 * | 1/2009 | Khatib ............... G06F 3/04817 715/765 |
| 2009/0031253 | A1 | 1/2009 | Lee et al. |
| 2009/0075697 | A1 | 3/2009 | Wilson et al. |
| 2009/0094553 | A1 | 4/2009 | Karstens |
| 2009/0094554 | A1 | 4/2009 | Karstens |
| 2009/0178008 | A1 | 7/2009 | Herz et al. |
| 2009/0192900 | A1 | 7/2009 | Collison et al. |
| 2009/0193363 | A1 | 7/2009 | Atherton |
| 2009/0227294 | A1 | 9/2009 | Ouchi et al. |
| 2010/0001968 | A1 | 1/2010 | Lee |
| 2010/0058182 | A1 | 3/2010 | Jung |
| 2010/0062796 | A1 | 3/2010 | Hayton et al. |
| 2010/0095248 | A1 | 4/2010 | Karstens |
| 2010/0127997 | A1 | 5/2010 | Park et al. |
| 2010/0138763 | A1 | 6/2010 | Kim |
| 2010/0164877 | A1 | 7/2010 | Yu et al. |
| 2011/0028186 | A1 | 2/2011 | Lee et al. |
| 2011/0039534 | A1 | 2/2011 | Lee et al. |
| 2012/0190386 | A1 | 7/2012 | Anderson |

FOREIGN PATENT DOCUMENTS

| | | |
|---|---|---|
| KR | 10-2006-0076710 A | 7/2006 |
| KR | 10-2007-0024808 A | 3/2007 |
| KR | 10-2008-0077798 A | 8/2008 |
| KR | 10-2009-0006311 A | 1/2009 |
| KR | 10-2010-0062252 A | 6/2010 |
| KR | 10-2011-0005555 A | 1/2011 |
| WO | 2008/012965 A1 | 1/2008 |

OTHER PUBLICATIONS

Anonymous, Icon grouping allowing common and individual icon interaction joining ICONS on screen, dragging objects targetted to specific ICON or collection, sizing ICONS and customising gps, Jul. 10, 1990, RD 315042 A, 1 pg.

Apple Corp., iPhone User Guide (For iOS 31 Software), Sep. 9, 2009, retrieved from the internet on Jun. 18, 2014 at http://support.apple.com/manuals/#phone.

"Graphical user interface" and "icon" definitions. IEEE Std 100, The Authoritative Dictionary of IEEE Standards Terms, 7th edition, copyright 2000 by The Institute of Electrical and Electronics Engineers. ISBN 0-7381-2601-2. pp. 487, 528.

Wikipedia, "Processor," [online], Nov. 11, 2008, URL:https://en.wikipedia.org/w/index.php?title=Processor&oldid=257253825, retrieved on Mar. 23, 2017.

* cited by examiner

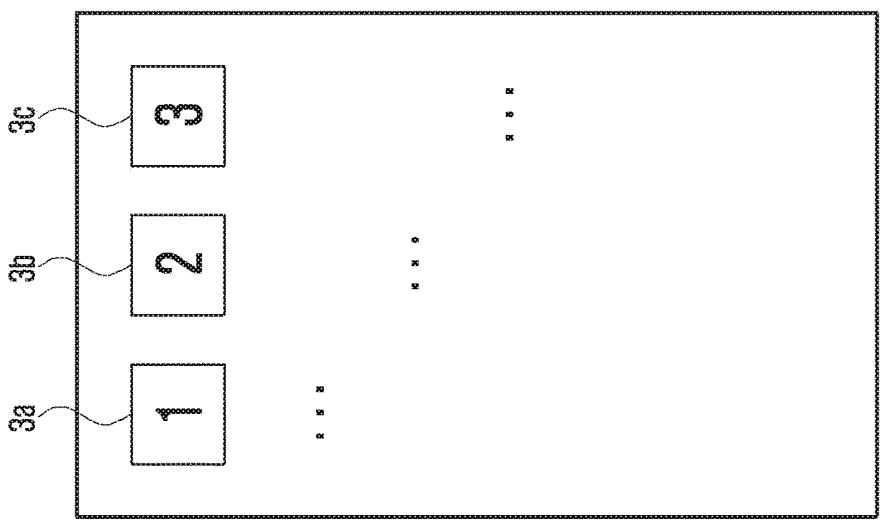
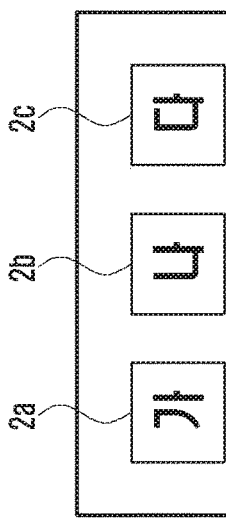
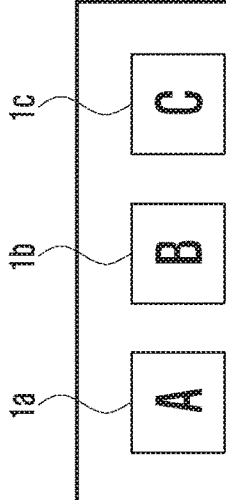

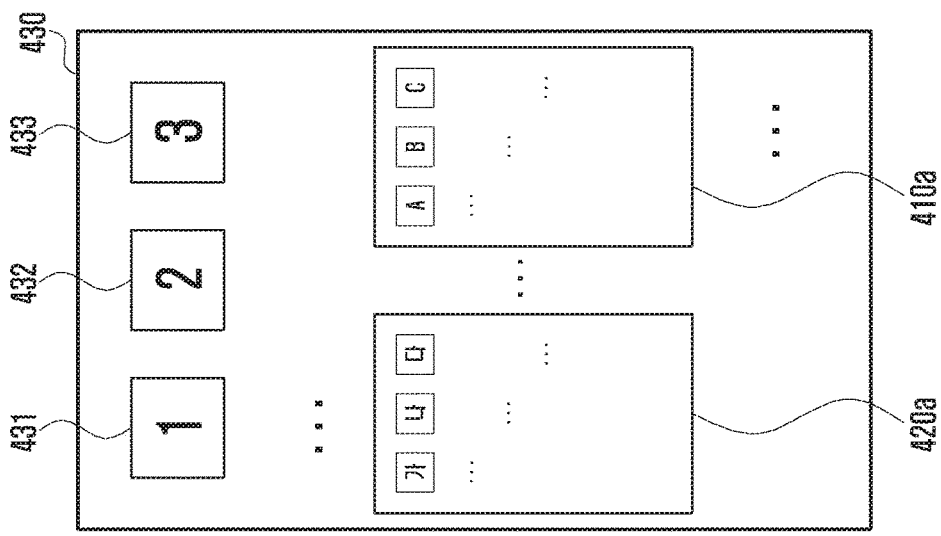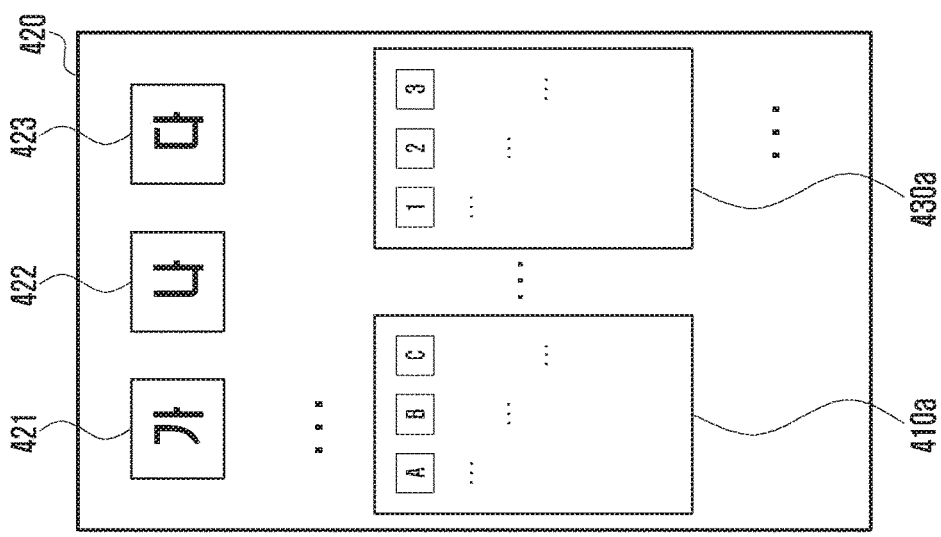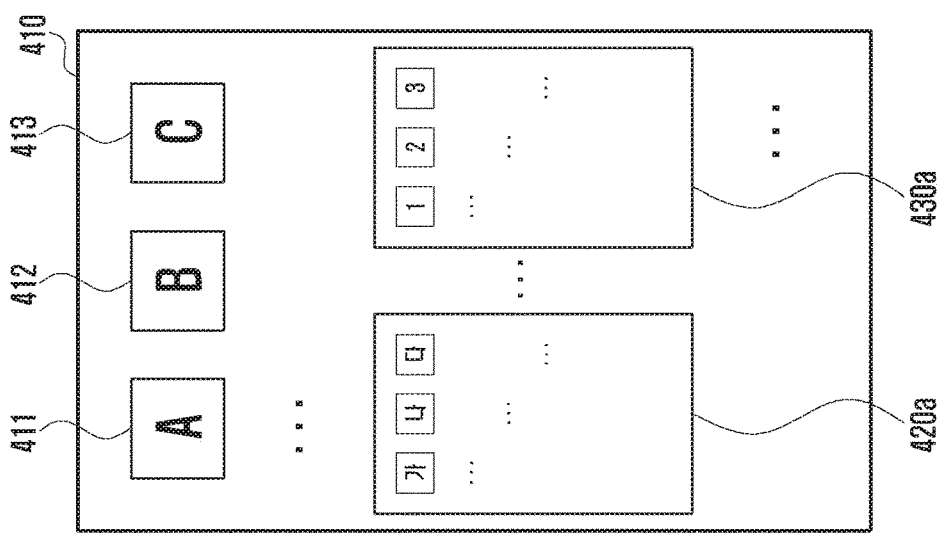

APPARATUS AND METHOD FOR GROUPING AND DISPLAYING ICONS ON A SCREEN

PRIORITY

This application is a continuation application of prior application Ser. No. 15/218,760, filed on Jul. 25, 2016, which is a continuation application of prior application Ser. No. 14/321,252, filed on Jul. 1, 2014, which has issued as U.S. Pat. No. 9,423,934 on Aug. 23, 2016, which is a continuation application of prior application Ser. No. 14/056,298, filed on Oct. 17, 2013, which has issued as U.S. Pat. No. 9,791,996 on Oct. 17, 2017, which is a continuation application of prior application Ser. No. 12/900,715, filed on Oct. 8, 2010, which has issued as U.S. Pat. No. 8,577,419 on Nov. 5, 2013, which was based on and claimed priority under 35 U.S.C. § 119(a) of a Korean patent application number 10-2009-0097255, filed on Oct. 13, 2009, in the Korean Intellectual Property Office, and the prior application Ser. No. 14/321,252 is a continuation application of prior application Ser. No. 12/905,408, filed on Oct. 15, 2010, which has issued as U.S. Pat. No. 10,082,948 on Sep. 25, 2018, which was based on and claimed priority under 35 U.S.C. § 119(a) of a Korean patent application number 10-2009-0098944, filed on Oct. 16, 2009, in the Korean Intellectual Property Office, the disclosure of each of which is incorporated by reference herein in its entirety.

BACKGROUND OF THE INVENTION

1. Field of the Invention

The present invention relates to a mobile terminal. More particularly, the present invention relates to a method for displaying a background screen in a mobile terminal.

2. Description of the Related Art

In general, the term "mobile terminal" refers to a communication device with which a user can communicate and exchange data with another user while mobile. As mobile communication environments for such a mobile terminal are developing more and more, the capabilities of the mobile terminal, which has only previously been used for voice communication, are increasing. For example, with such a mobile terminal, the user may use Audio On Demand (AOD) and Video On Demand (VOD) services, may have mobile visual communication with another user in real time through the use of a camera installed in the mobile terminal, may download and play a game application, or may view a Digital Multimedia Broadcast (DMB) through the use of a DMB receiver. That is, mobile terminals have evolved into a device that enables the user to use various types of information in addition to the voice communication function.

A touch screen is a type of display that includes a display unit and an input unit. Recently, touch screens have become popular user interfaces for many electronic systems. Touch screens are especially conducive to small electronic devices, e.g., mobile devices.

The increase in capabilities of the mobile terminal leads to an increase in the kinds of applications to select and execute, which in turn means an increase in the kinds of icons, corresponding to applications, which are used to access the applications. However, since the mobile terminal is limited in size, it is not easy to display all icons on a display which likewise has a limited size.

In order to address such a problem, there has been proposed a method of setting a plurality of background screens displayed on a display unit, disposing a plurality of icons according to the set background screens, and enabling the user to make transitions between the background screens and to use the background screens as needed, so that a large number of icons can all be displayed on one display unit.

FIGS. 1A-1C are views illustrating background screens based on a method for displaying a background screen according to the related art.

Referring to FIGS. 1A-1C, the user may set a first background screen including icons 1a, 1b, and 1c, as shown in FIG. 1A, a second background screen including icons 2a, 2b, and 2c, as shown in FIG. 1B, and a third background screen including icons 3a, 3b, and 3c, as shown in FIG. 1C. Thereafter, when the user is to execute a specific application, the user identifies the location of an icon corresponding to the specific application while making transitions between the background screens shown in FIGS. 1A-1C in order to find the specific application, and executes the specific application by executing the icon when the user has identified the location of the icon. For example, when an icon corresponding an application the user desires to execute is icon 2a shown in a background screen shown in FIG. 1B, the user identifies that icon 2a has been registered in the background screen shown in FIG. 1B while making transitions between the three background screens shown in FIGS. 1A-1C, makes a transition to the background screen shown in FIG. 1B, and executes the icon 2a, thereby executing the desired application.

According to the method of the related art that is described with reference to FIGS. 1A-1C, icons are set according to background screens, so that all icons can be registered (or disposed) among the various background screens despite there being many icons. However, when the number of executable applications in a mobile terminal increases, the number of icons increases accordingly, thereby causing inconvenience to the user. That is, when there is a large number of icons, it is difficult for the user to remember which background screen an icon corresponding to a desired application is included in. Accordingly, the user must search for the corresponding icon while continuously making transitions between background screens, which causes inconvenience to the user.

Accordingly, there is a need to develop a method for enabling the user to easily identify icons registered according to background screens so that the user can rapidly execute a desired application.

SUMMARY OF THE INVENTION

An aspect of the present invention is to address at least the above-mentioned problems and/or disadvantages and to provide at least the advantages described below. Accordingly, an aspect of the present invention is to provide a method for enabling a user to easily identify icons registered according to background screens so that the user can rapidly execute a desired application.

In accordance with an aspect of the present invention, a method for displaying a background screen in a mobile terminal is provided. The method includes resizing other background screens, except for a current background screen currently being displayed, among a plurality of background screens to a predefined display size when a predefined key is input, and displaying the resized background screens in predefined regions, respectively, within a display area in which the current background screen is displayed.

In accordance with another aspect of the present invention, a mobile terminal apparatus for displaying a background screen is provided. The apparatus includes a display unit for displaying a background screen to a user, an input unit for receiving input from the user, and a controller for controlling to resize other background screens, except for a current background screen currently being displayed, among a plurality of background screens to a predefined display size when a predefined key is input, and for controlling to display the resized background screens in predefined regions, respectively, within a display area of the display in which the current background screen is displayed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 1A-1C are views illustrating background screens based on a method for displaying a background screen according to the related art;

FIGS. 4A-4C are views showing a first example of background screens based on a method for displaying a background screen according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 2:
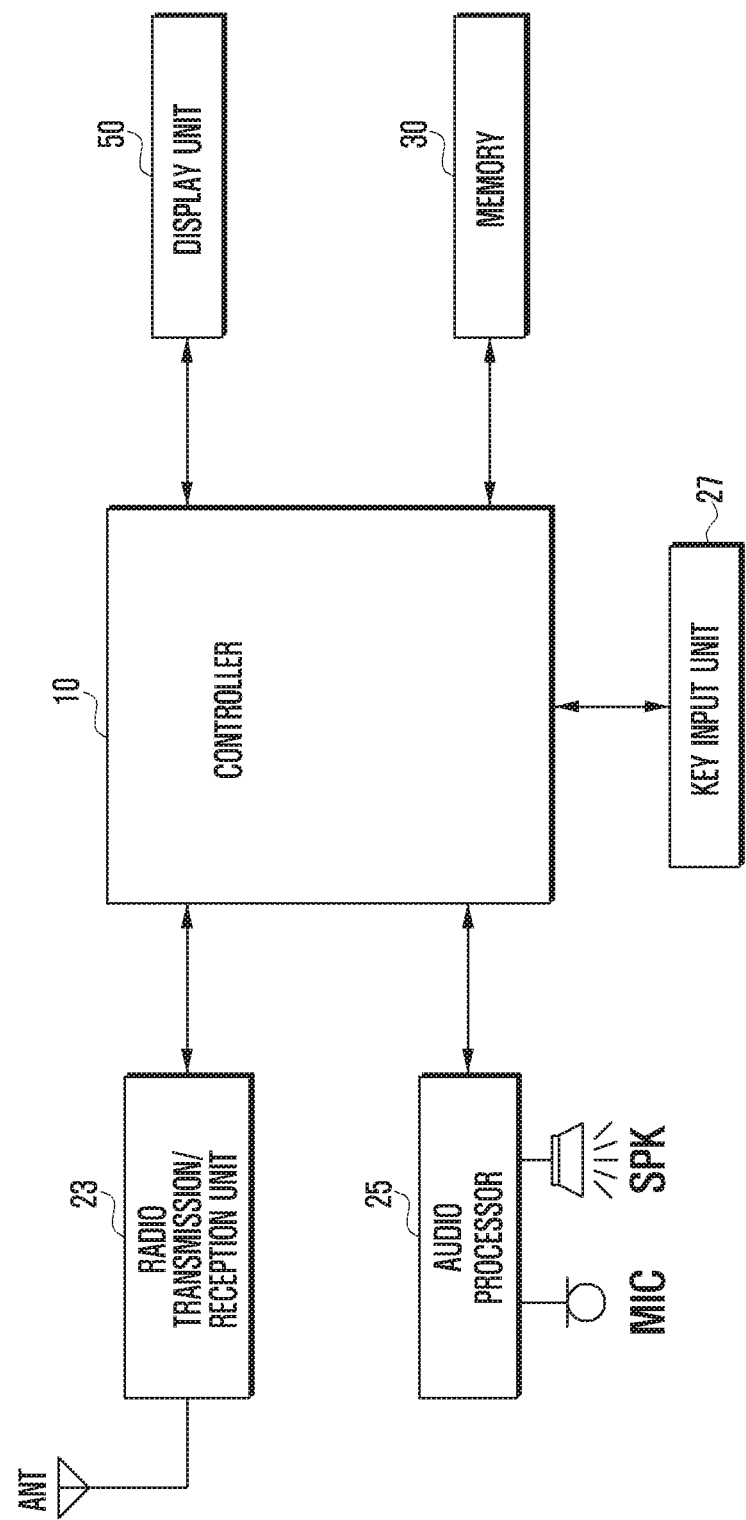
FIG. 2 is a block diagram illustrating the configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to explaining exemplary embodiments of the present invention, terminologies will be defined for the description below. The terms or words described in the present description and the claims should not be limited by a general or lexical meaning, but instead should be understood as meanings and concepts through which the inventor describes the present invention. Therefore, one skilled in the art will understand that the exemplary embodiments disclosed in the description and configurations illustrated in the drawings are only exemplary, and there may be various modifications, alterations, and equivalents thereof to replace the exemplary embodiments at the time of filing this application without departing from the spirit or scope of the present invention.

In the following description, the term 'mobile device' refers to an information processing system that can display, store, create, and delete data. The term 'mobile device' can be applied to computers, laptop computers, mobile communication devices, etc. The mobile device is equipped with a touch screen and displays a number of shortcut icons in the background image on the touch screen.

The term 'shortcut icon' refers to a selectable icon that is associated with a particular function and displayed as an image, a letter, etc. If a user selects a shortcut icon on the touch screen, the mobile device detects a function associated with the selected shortcut icon and performs the detected function.

The 'background screen' refers to an idle screen displayed on the touch screen when the mobile device is in an idle state. In an exemplary embodiment of the present invention, the background screen is an idle screen on which at least a shortcut icon for performing a particular function is displayed according to the user's selection.

The configuration of a mobile terminal according to an exemplary embodiment of the present invention will now be described with reference to FIG. 2.

FIG. 2 is a block diagram illustrating the configuration of a mobile terminal according to an exemplary embodiment of the present invention.

Referring to FIG. 2, a key input unit 27 includes keys for inputting numeric and text information, and function keys for setting various functions.

A radio transmission/reception unit 23 performs a wireless communication function of the mobile terminal, and includes a Radio Frequency (RF) module and a modem. The RF module includes an RF transmitter for up-converting a frequency of a transmission signal and amplifying the up-converted signal, and an RF receiver for low-noise amplifying a received signal and down-converting a frequency of the low-noise amplified signal. The modem includes a transmission section for encoding and modulating signals to be transmitted, and a reception section for demodulating and decoding signals received by the RF module.

An audio processor 25 may include a codec, which may contain a data codec and an audio codec. The data codec processes packet data or the like, and the audio codec processes audio signals, including voice, a multimedia file, etc. In addition, the audio processor 25 converts a digital audio signal received from the modem into an analog signal by means of the audio codec, and reproduces the analog signal. Also, the audio processor 25 converts an analog audio signal generated from a microphone (MIC) into a digital audio signal by means of the audio codec, and transfers the digital audio signal to the modem. In this case, the codec may be provided separately, or may be included in a controller 10 of the mobile terminal.

The memory 30 includes a Read Only Memory (ROM) and a Random Access Memory (RAM). The memory 30 may be configured by a program memory and a data memory, and may store data for booting and programs for controlling the operation of the mobile terminal.

A display unit 50 displays a video signal and/or user data on a screen, or displays communication-related data. In this case, the display unit 50 may be constructed with a Liquid Crystal Display (LCD), an Organic Light-Emitting Diode (OLED), and/or an Active Matrix Organic Light-Emitting Diode (AMOLED). When the LCD, OLED, and/or AMOLED is implemented in a touch screen type, the display unit 50 may serve as an input unit for controlling the mobile terminal together with the key input unit 27. Therefore, according to an exemplary embodiment of the present invention, the display unit 50 may include a touch screen, and serve as an input unit for controlling the mobile terminal together with the key input unit 27.

The controller 10 functions to control general operations of the mobile terminal. According to an exemplary embodiment of the present invention, when there is a plurality of set background screens, the controller 10 performs a control operation in such a manner as to resize background screens, other than the current background screen which is displayed in the display unit 50 according to a predefined key input, to have a predefined display size, and to display the resized background screens in predefined regions of the current background screen, respectively.

Figure 3:
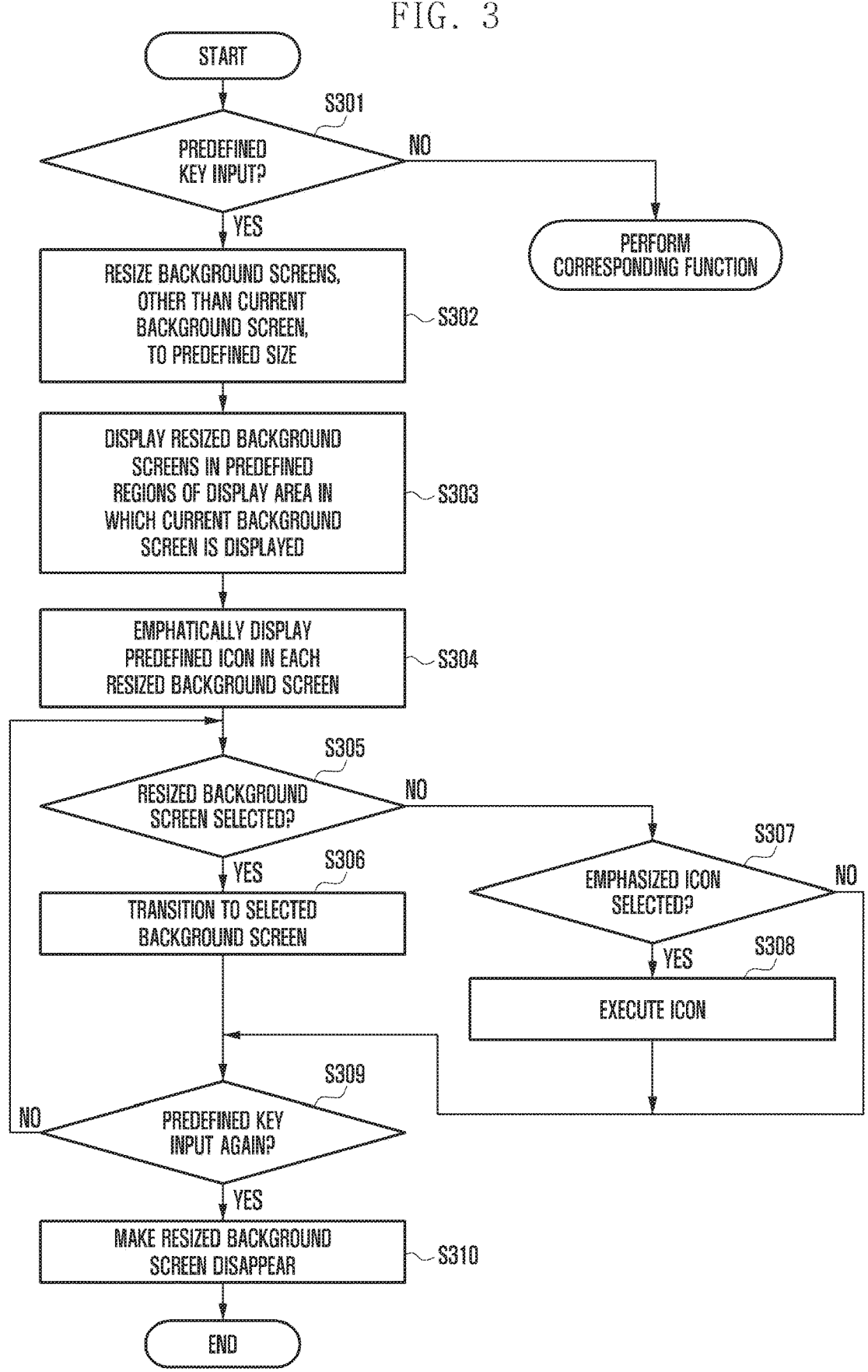
FIG. 3 is a flowchart illustrating a method for displaying a background screen according to an exemplary embodiment of the present invention.

FIG. 3 is a flowchart illustrating the method for displaying a background screen according to an exemplary embodiment of the present invention, and FIGS. 4A-4C and 5A-5C are views showing examples of background screens based on the method for displaying a background screen according to an exemplary embodiment of the present invention. Exemplary embodiments of the present invention will now be described with reference to FIGS. 2 to 5C.

In step S301 the controller 10 determines if a predefined key is input by a user. If the controller 10 determines that the predefined key is not input by a user, a corresponding function is performed. However, if the controller 10 determines that the predefined key is input by the user, the controller 10 performs a control operation to resize background screens, other than the current background screen, to a predefined display size in step S302, and to display the resized background screens at predefined locations in the current background screen in step S303.

In step S301, the predefined key refers to a key which is preset to resize background screens, other than a background screen currently being used by the user, to the predefined display size when a plurality of background screens have been registered in the mobile terminal. For example, when a specified key of the key input unit 27 is input (e.g., when a short or long key signal is input), or when a touch signal is input to the display unit 50 through a touch screen (e.g., when a specified location is touched or is touched for a long period of time), it may be determined that the predefined key is input. Meanwhile, a background screen 410 shown in FIG. 4A includes a plurality of icons 411, 412, and 413 for executing specific applications, a background screen 420 shown in FIG. 4B includes a plurality of icons 421, 422, and 423, and a background screen 430 shown in FIG. 4C includes a plurality of icons 431, 432, and 433, which are shown as an example.

Therefore, when the three background screens 410, 420, and 430 shown in FIGS. 4A-4C have been registered in the mobile terminal, and a predefined key input is detected in a state where the background screen 410 is currently being used by the user, the controller 10 performs a control operation to resize the background screens 420 and 430 to a predefined size, as indicated by reference numbers 420a and 430a, respectively, and to display the resized background screens at predefined locations (or in predefined regions) of a display area in which the current background screen is displayed, as shown in the background screen 410 shown in FIG. 4A. Also, when a predefined key input is detected in a state where the background screen 420 is currently being used by the user, the controller 10 performs a control operation to resize the background screens 410 and 430 to a predefined size, as indicated by reference numbers 410a and 430a, respectively, and to display the resized background screens at predefined locations of a display area in which the current background screen is displayed, as shown in the background screen 420 shown in FIG. 4B. In addition, when a predefined key input is sensed in a state where the background screen 430 is currently being used by the user, the controller 10 performs a control operation to resize the background screens 420 and 410 to a predefined size, as indicated by reference numbers 420a and 410a, respectively, and to display the resized background screens at predefined locations of a display area in which the current background screen is displayed, as shown in the background screen 430 shown in FIG. 4C.

According to another exemplary embodiment of the present invention, the controller 10 may perform a control operation to resize and display icons also included in a resized and displayed background screen, to a predefined size corresponding to or not corresponding to the resized size of the background screen. When the resized background screens 410a, 420a, and 430a and icons included in each corresponding background screen are resized and displayed together, as shown in the background screens shown in FIGS. 4A-4C, the user may easily visually identify which icons have been registered or disposed in each background screen.

Also, according to another exemplary embodiment of the present invention, the controller 10 may perform a control operation such that the resized and displayed background screens have a characteristic (e.g., transparency, background color, a background image, etc.) for distinguishing the resized and displayed background screens from the current background screen. For example, in order to distinguish a resized and displayed background screen from the current background screen, the controller 10 may control the transparency of the resized and displayed background screen (e.g., to a transparency selected from a range of 0% to 100%), may change the background color of the resized and displayed background screen to a color different from the color of the current background screen, or may change the background image of the resized and displayed background screen to an image (e.g., wallpaper) different from the image of the current background screen.

After steps S301 to S303, the controller 10 emphatically displays a predefined icon in each resized and displayed background screen in step S304.

According to an exemplary embodiment of the present invention, the controller 10 may record an icon execution history performed by the user in a database, for example, in such a manner as to count the number of times of execution of each icon and/or an execution time of each icon, through which the controller 10 can identify the number of times of execution (or selection), and/or an execution (or selection) time according to each icon. Accordingly, according to an exemplary embodiment of the present invention, the controller 10 may emphatically display an icon executed by the largest number of times or a most recently executed icon among icons registered in each background screen so as to distinguish the corresponding icon from other icons. In this case, emphatically (or distinctively) displaying an icon according to an exemplary embodiment of the present invention denotes displaying the corresponding icon in a larger size than other icons or in a reversed form thereof. Through such a visual effect, the user can easily identify one or more icons which have been the most recently or frequently executed.

On the assumption that the most frequently or most recently used icon in each background screen corresponds to the icon 411 in the background screen 410, the icon 421 in the background screen 420, and the icon 431 in the background screen 430, an example of the operation performed in step S304 will now be described with reference to FIGS. 5A-5C.

Figure 5A:
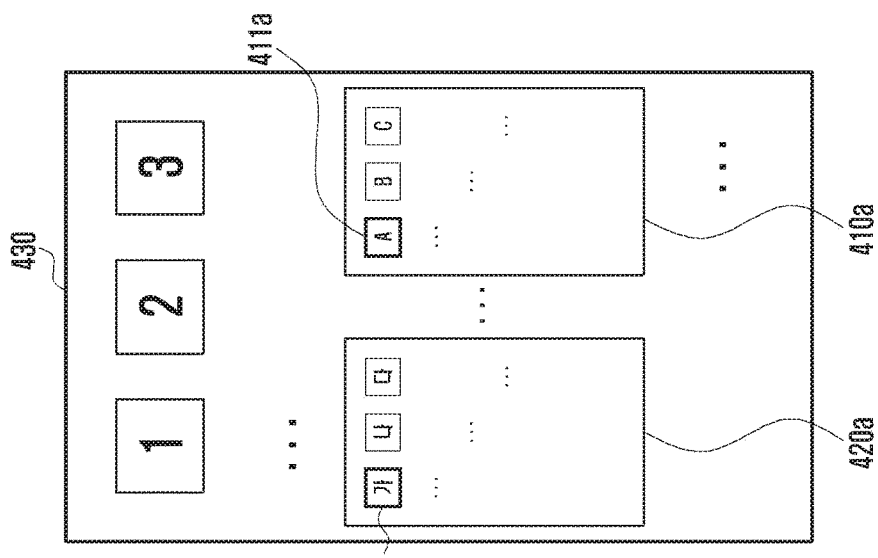
FIGS. 5A-5C are views showing a second example of background screens based on a method for displaying a background screen according to an exemplary embodiment of the present invention.
Figure 5B:
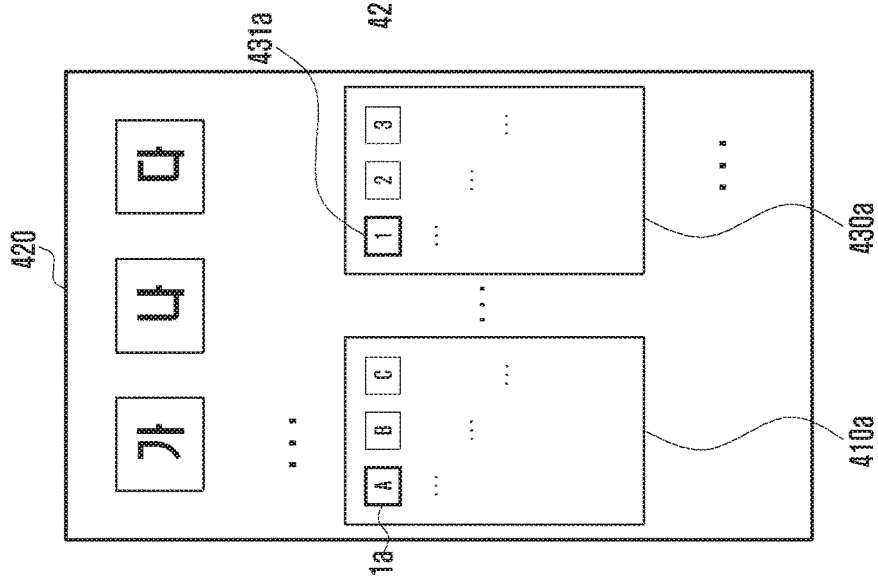

The background screen shown in FIG. 5A shows a modified example of the exemplary embodiment of the present invention described with reference to the background screen shown in FIG. 4A. In more detail, the background screen shown in FIG. 5A shows an example where the background screens 420 and 430 are resized to the background screens 420a and 430a and displayed, and icons 421 and 431 (see FIGS. 4B-4C), which are the most frequently or most recently used in the corresponding background screens 420 and 430, are resized/emphasized and displayed as icons 421a and 431a. The background screens shown in FIGS. 5B and 5C may be described in a similar manner to that described on the background screen as shown in FIG. 5A. Accordingly, icons 411a and 431a are resized/emphasized and displayed as part of background screens 410a and 430a, respectively, in background screen 420 shown in FIG. 5B. And icons 421a and 411a are resized/emphasized and displayed as part of background screens 420a and 410a, respectively, in background screen 430 shown in FIG. 5C. Although the above description with reference to FIG. 5A and step S304 has been given on the case where only one icon is emphatically displayed according to each background screen, a plurality of icons may be emphatically displayed according to each resized and displayed background screen, which can be set by the user. For example, the controller 10 may emphatically display icons executed equal to or more than a predefined number of times according to each resized and displayed background screen. In this case, when icons are emphatically displayed, the user may set to preferentially emphasize and display the most recently executed icon, to preferentially emphasize and display the most recently executed icon, or to preferentially emphasize and display the most recently executed icon and the most recently executed icon at the same time. Also, the user may preset an icon to be emphatically displayed in a predefined background screen when the predefined background screen is resized and displayed.

After steps S301 to S304, the controller 10 determines if one of the resized background screens is selected in step S305, and makes a transition to a selected background screen in step S306 when it is determined that one of the resized background screens is selected.

When background screens and icons are resized and displayed, the user can identify a background screen in which an icon corresponding to an application desired to be executed by the user through the resized and displayed background screens and icons, and can make a transition to the corresponding background screen in order to execute the desired application. For example, in a state where the current background screen 420 and resized background screens 410a and 430a are displayed as shown in FIG. 4B, when an icon corresponding to an application desired to be executed by the user is located in the resized background screen 410a, the user may select the resized background screen 410a to make a transition to the background screen 410. When a transition has been made to the background screen 410, a list of icons 411, 412, and 413 registered in the background screen 410 is displayed in the background screen 410, and the user may execute one of the icons registered in the background screen 410 displayed by the transition so as to request a corresponding application to be executed. In this case, the selection of a resized background screen can be achieved by a key input (e.g., a directional key input) through the key input unit 27, or by a touch screen input such as either touching the resized background screen or dragging into the resized background screen. Also, according to an exemplary embodiment of the present invention, when the mobile terminal includes a device, such as an earth magnetic field sensor, sensing the motion of the mobile terminal, the user can request a transition to a resized and displayed background screen by moving the mobile terminal to a location of the resized and displayed background screen. For example, in a state where the background screen 410 shown in FIG. 4A is displayed, the user may move the mobile terminal to the left to make a transition to the background screen 420, or may move the mobile terminal to the right to transition to the background screen 430.

Separately from steps S305 and S306, when an icon emphasized by the user is selected in step S307, the controller 10 performs a control operation to execute an application corresponding to the selected icon in step S308.

An application desired by the user may be executed by making a transition to a background screen, as described in steps S305 and S306, and then executing an icon corresponding to the desired application, or an additional adjustment of the mobile station by the user may be required for executing the desired application. Therefore, according to an exemplary embodiment of the present invention, there is proposed a method for immediately executing an application corresponding to only an emphatically displayed icon when the emphasized icon is selected.

Figure 5C:
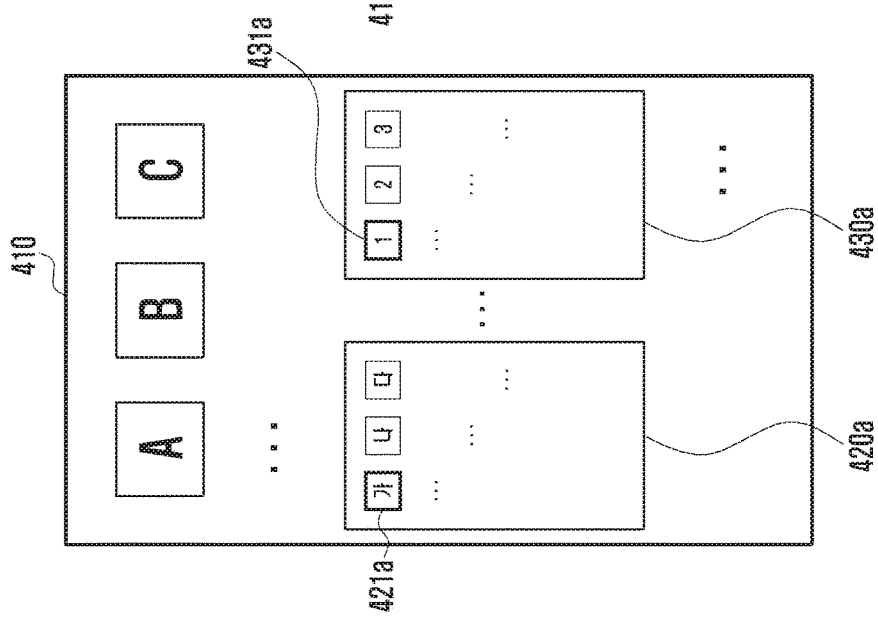

For example, as shown in the background screen shown in FIG. 5C, when an icon 421 corresponding to an application desired to be executed by the user is emphatically displayed as an icon 421a, the user can request an immediate execution of the application corresponding to the icon 421 by selecting or executing the icon 421a. In this case, the selection of the emphatically displayed icon 411a, 421a, or 431a may be achieved by a direction key input, by a touch screen input, or by a motion of the mobile terminal, as well.

After step S306 and step S308, the controller 10 determines if a predefined key signal, as input in step S301, is again input in step S309, and performs a control operation to make the resized and displayed background screen disappear in step S310 when the predefined key signal is again input. In contrast, if the predefined key is not again input at operation S309, then the controller 10 returns to and proceeds with step S305.

When the predefined key signal is again input, the controller 10 performs a control operation to make the resized and displayed background screens (e.g., background screens 410a, 420a, and 430a) disappear from a background screen as shown in FIGS. 4A-4C and 5A-5C so that only the current background screen (or a background screen resulting from a transition) can be displayed in the display unit 50. Through this, the user can more easily identify icons registered in the background screens.

Although the technical aspects of the present invention have been described in detail with the exemplary embodiments of the present invention, it should be appreciated that the exemplary embodiments described above are not limiting, but are instead only illustrative.

According to exemplary embodiments of the present invention, the user can easily identify icons registered according to each background screen, so that the user can rapidly execute a desired application.

In addition, according to the exemplary embodiments of the present invention, one or more frequently or recently executed icons among icons registered in each background screen are emphatically displayed, so that the user can rapidly and easily execute frequently or recently executed applications.

Mobile devices with a touch screen have become popular because they provide a variety of functions. Such mobile devices may display shortcut icons for frequently used functions in the background image of the touch screen, so that a user can easily select and execute a corresponding function. A method for displaying shortcut icons according to the related art is explained with reference to FIG. 6.

Figure 6:
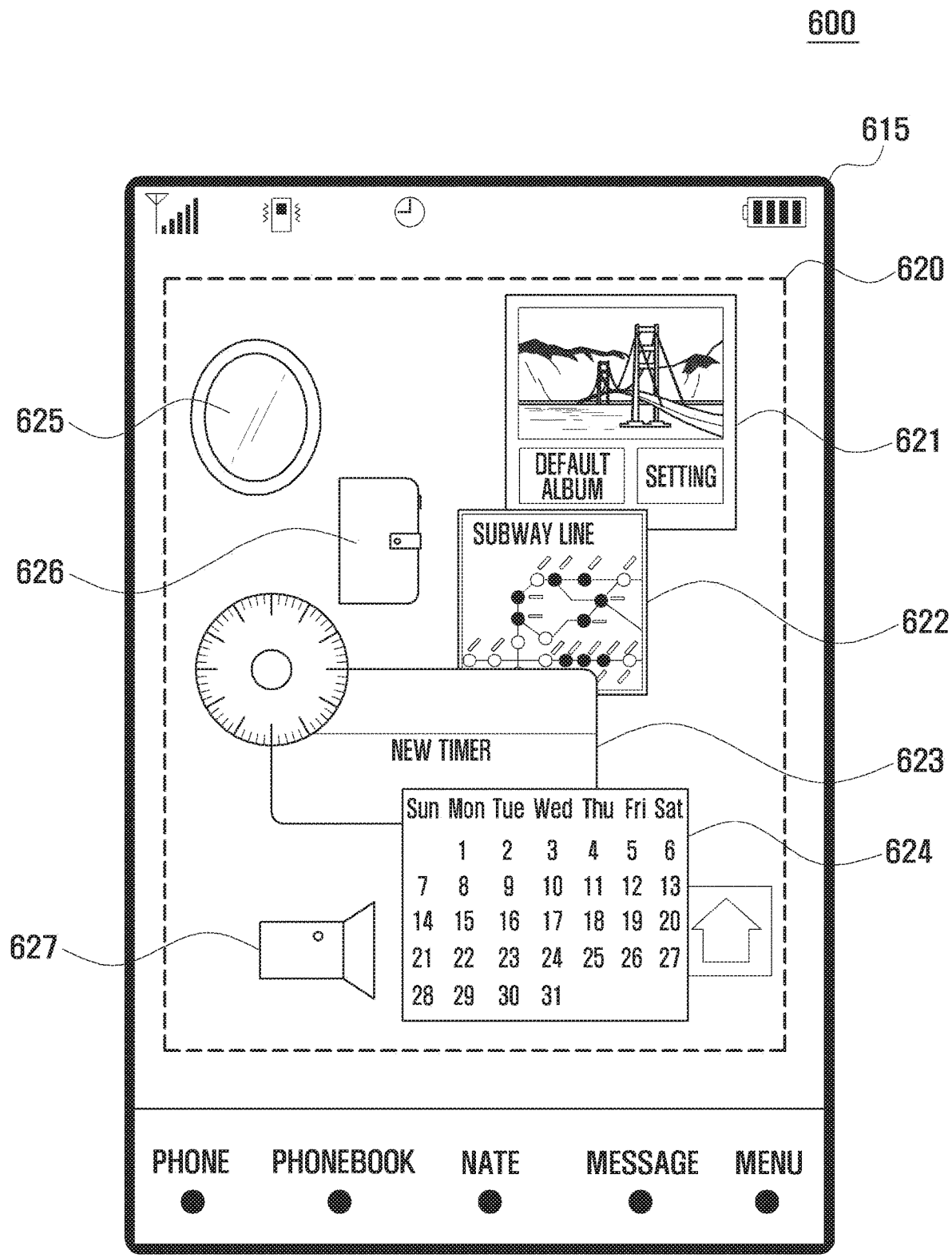
FIG. 6 illustrates a screen of a mobile device, displaying shortcut icons according to a related art.

FIG. 6 illustrates a screen of a mobile device, displaying shortcut icons according to the related art.

The mobile device 600 may display a number of shortcut icons on the screen 615, according to a user's selection. For example, as shown in FIG. 6, the mobile device 600 may display several shortcut icons on the screen 620, for example, a shortcut icon 621 for altering background images, a shortcut icon 622 for identifying subway lines, a timer shortcut icon 623, a schedule shortcut icon 624, a shortcut icon 625 for executing a mirror function, a diary shortcut icon 626, and a volume control icon 627.

However, because the size of the touch screen is limited, the touch screen can only display a limited number of shortcut icons. In addition, if several shortcut icons are displayed on the screen, they may be superimposed over one another. In that case, the user may be unable to designate a shortcut icon that he/she intended to select.

A shortcut icon display method and a mobile device adapted to the method are provided. The method includes displaying, if a group icon including at least two icons is selected, at least two icons included in the group icon, and performing a function corresponding to a selected one of at least two displayed icons. The method displays a number of icons on a screen once so that the user can easily select grouped icons.

Figure 7:
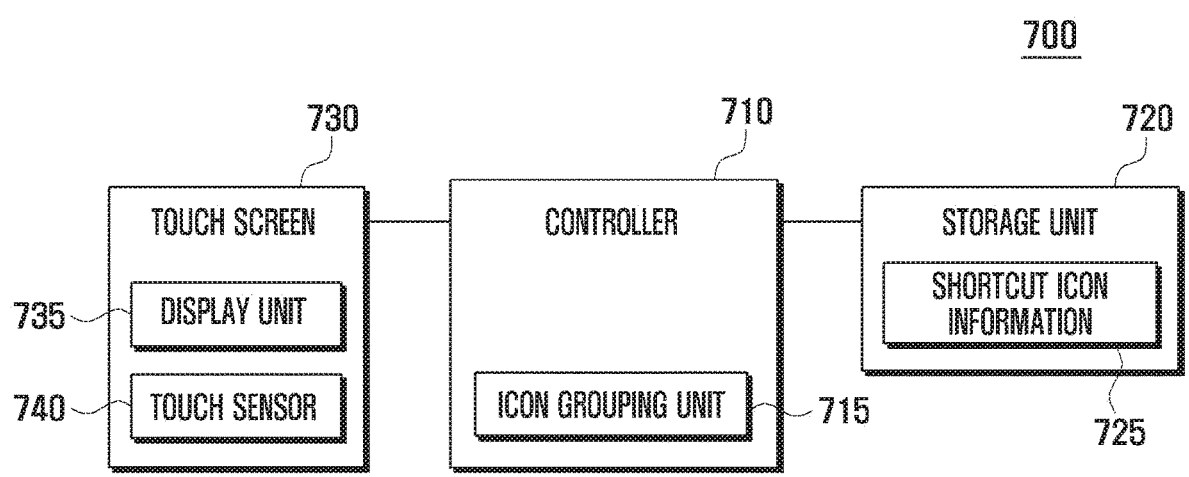
FIG. 7 illustrates a schematic block diagram of a mobile device according to an exemplary embodiment of the present invention.

FIG. 7 illustrates a schematic block diagram of a mobile device according to an exemplary embodiment of the present invention.

Referring to FIG. 7, the mobile device 700 includes a controller 710, a storage unit 720, and a touch screen 730.

The controller 710 controls the entire operation and state of the components in the mobile device 700. In an exemplary embodiment of the present invention, the controller 710 groups shortcut icons or ungroups the grouped shortcut icons on a background screen, according to a user's selection. To this end, the controller 710 includes an icon grouping unit 715.

The icon grouping unit 715 groups shortcut icons in one or more groups or ungroups the group icons on the background screen, according to a user's selection. For example, the icon grouping unit 715 groups at least two shortcut icons, selected by the user, in a group. There are two methods for grouping at least two shortcut icons in a group. In the first method, at least two shortcut icons are grouped in a particular region, which is set as a group icon display region, on a display unit 735 of the touch screen 730. In the second method, a first shortcut icon is moved into a region on which a second shortcut icon has been displayed, so that they are grouped.

The first method for grouping at least two shortcut icons, located in the group icon display region, is explained below.

The icon grouping unit 715 determines whether a shortcut icon grouping function is executed via a menu or shortcut key. If a shortcut icon grouping function has been executed via a menu or shortcut key, the icon grouping unit 715 determines whether the user selects the group icon display region on the display unit 735. The group icon display region refers to a region for displaying shortcut icons grouped according to a user's selection. When the user has selected the group icon display region, the icon grouping unit 715 determines whether at least one shortcut icon is moved to the group icon display region.

If the icon grouping unit 715 ascertains that at least one shortcut icon is moved to the group icon display region, it detects the shortcut icons moved to the group icon display region. After that, the icon grouping unit 715 groups at least one shortcut icon, located in the group icon display region. The icon grouping unit 715 detects functions performed by the grouped shortcut icons, respectively, and location information about the regions on which the grouped shortcut icons are displayed.

The second method for grouping at least two shortcut icons if they are located at the same region is explained below.

The icon grouping unit 715 determines whether a shortcut icon grouping function is executed via a menu or a shortcut key. If a shortcut icon grouping function has been executed, the icon grouping unit 715 determines whether a first one of the shortcut icons displayed on the display unit 735 is moving. If the icon grouping unit 715 detects the movement of the first shortcut icon, it determines whether the first shortcut icon is moved to a region where a second shortcut icon has been displayed.

If the first shortcut icon is moved to and located in the region where a second shortcut icon has been displayed, the icon grouping unit 715 groups the first and second shortcut icons. The icon grouping unit 715 detects functions, performed by the grouped shortcut icons, and location information about the grouped shortcut icons.

Although the exemplary embodiment has been explained in such a way that the icon grouping unit 715 groups the shortcut icons located in a particular region on the display unit 735, it should be understood that the present invention is not limited to the exemplary embodiment. For example, if the user selects a number of shortcut icons to be grouped and then operates a menu or function key, the icon grouping unit 715 can group the selected shortcut icons. Alternatively, if the user selects a menu for grouping shortcut icons, such as a group setting menu, and then a number of shortcut icons displayed on the display unit 735, the icon grouping unit 715 can group the selected shortcut icons.

On the other hand, if the user executes an icon ungrouping function, the icon grouping unit 715 ungroups the grouped shortcut icons. The icon ungrouping function is executed by a menu or a function key. If the mobile device 700 is equipped with a motion sensor, such as a geomagnetic sensor, the icon grouping unit 715 can perform an icon ungrouping function according to a predetermined motion of the mobile device 700. For example, a shaking motion of the mobile device 700 may be set to execute the icon ungrouping function. In that case, if the user selects a group icon and then shakes the mobile device 700, the icon grouping unit 715 can ungroup it.

The controller 710 controls the storage unit 720 to store information about the functions that are performed, respectively, by the shortcut icons grouped in a group icon, and a region on which the group icon is displayed. The controller 710 controls the display unit 735 to display at least one group icon that groups shortcut icons via the icon grouping unit 715. The group icon shows shortcut icons, contained therein, in reduced size. If the group icon is ungrouped, the controller 710 controls the display unit 735 to display the shortcut icons, grouped in the group icon, on their locations before they are grouped.

The controller 710 can magnify and display a shortcut icon, grouped in the group icon, according to a user selection. In an exemplary embodiment of the present invention, it is assumed that the first and second shortcut icons are grouped in a group icon on the touch screen 730 of the mobile device 700. If the first touch event occurs on a region on which the group icon is displayed on the touch screen 730, the controller 710 magnifies and displays the first shortcut icon greater than the second icon. Alternatively, if the second touch event occurs, the controller 710 magnifies and displays the second shortcut icon greater than the first icon. In addition, if a touch event occurs, twice, successively, on the region where the magnified shortcut icon is displayed on the touch screen 730, the controller 710 performs a function corresponding to the magnified shortcut icon.

The storage unit 720 stores applications required to perform functions of the mobile device 700 and data created when the applications are executed. The storage unit 720 also stores shortcut icon information 725 that includes functions mapped to shortcut icons, images for displaying the shortcut icons, and information about locations where the shortcut icons are displayed. If at least two shortcut icons are grouped to create a group icon, the storage unit 720 stores location information about the group icon and information about functions of the shortcut icons grouped in the group icon, under the control of the controller 710.

The touch screen 730 includes a display unit 735 and a touch sensor 740.

The display unit 735 displays information, related to the entire state and operation of the mobile device 700, under the control of the controller 710. The display unit 735 also displays group icons under the control of the controller 710. The method for displaying group icons will be explained, in detail, later, with reference to FIGS. 8 and 9.

The touch sensor 740 is installed to the display unit 735 and detects a touch event created when an object, e.g., a user's finger or a stylus, touches or releases the touch screen 730. The touch sensor 740 transfers a coordinate corresponding to a region where a touch event has occurred to the controller 710. The controller 710 can detect information about a region where a group icon will be displayed and information about a region to which a shortcut icon is moved, using the received coordinate.

The mobile device 700, configured as described above, can group at least two shortcut icons in a group and displays the group icon. If the mobile device 700 detects a touch to the group icon, it magnifies and displays the shortcut icons in the group icon, in order. This process allows the mobile device user to easily detect the shortcut icons in the group icon. The process also allows the mobile device 700 to display a number of shortcut icons.

Figure 8:
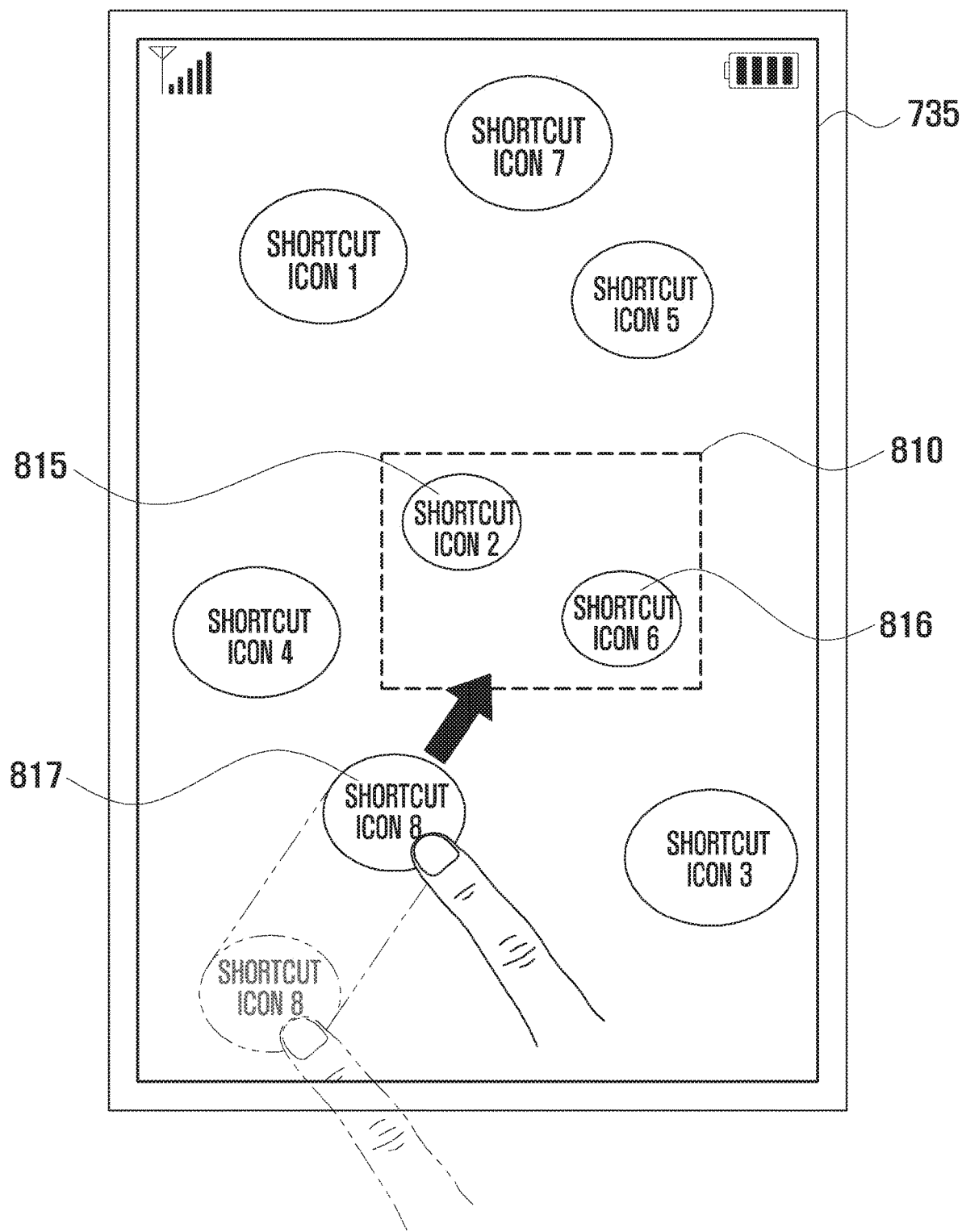
FIG. 8 illustrates an exemplary screen of a mobile device, displaying shortcut icons, according to an exemplary embodiment of the present invention.

FIG. 8 illustrates an exemplary screen of a mobile device, displaying shortcut icons, according to an exemplary embodiment of the present invention.

Referring to FIG. 8, the display unit 735 displays eight shortcut icons, Shortcut icons 1 to 8, on the background screen, under the control of the controller 710. If a shortcut icon grouping function is selected, the controller 710 groups at least two shortcut icons in a group icon display region 810, for example, Shortcut icon 2 (815) and Shortcut icon 6 (816), on the display unit 735. If the user moves Shortcut icon 8 (817) to the group icon display region 310, the controller 710 controls the display unit 735 to display a group icon, grouping Shortcut icon 2 (815), Shortcut icon 6 (816), and Shortcut icon 8 (817), in the group icon display region 810.

Figure 9:
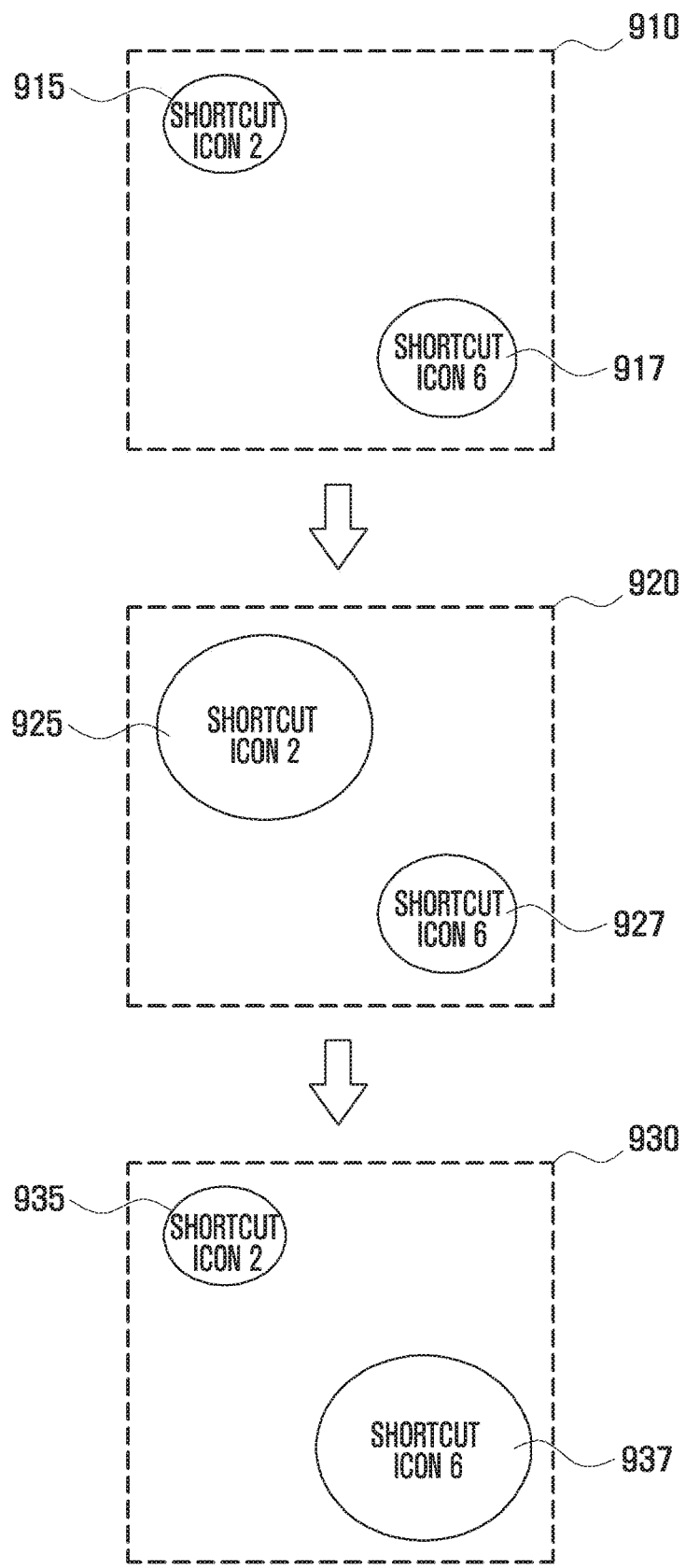
FIG. 9 illustrates exemplary screens of a mobile device that describes a process of selecting a shortcut icon, according to an exemplary embodiment of the present invention.

FIG. 9 illustrates exemplary screens of a mobile device that describe a process of selecting a shortcut icon, according to an exemplary embodiment of the present invention.

Referring to FIG. 9, diagram 910 shows a group icon where Shortcut icon 2 (915) and Shortcut icon 6 (917) are grouped. Grouped Shortcut icon 2 (915) and Shortcut icon 6 (917) are reduced at the same rate and displayed relatively small.

Diagram 920 shows a group icon where Shortcut icon 2 (925) is magnified and displayed greater than Shortcut icon 6 (927). If the user selects the group icon once to identify the grouped shortcut icons, the display unit 735 magnifies and displays Shortcut icon 2 (925) greater than Shortcut icon 6 (927), under the control of the controller 710.

Diagram 930 shows a group icon where Shortcut icon 6 (937) is magnified and displayed greater than Shortcut icon 2 (935). If the user selects the group icon twice to identify the grouped shortcut icons, the display unit 735 magnifies and displays Shortcut icon 6 (937) greater than Shortcut icon 2 (935), under the control of the controller 710.

The order of magnifying the shortcut icons can be set, for example, according to the order of selecting the shortcut icons when the group icon is set, the frequency order of using the functions of the shortcut icons, or the order of locations where the shortcut icons are displayed in the group icon.

Figure 10:
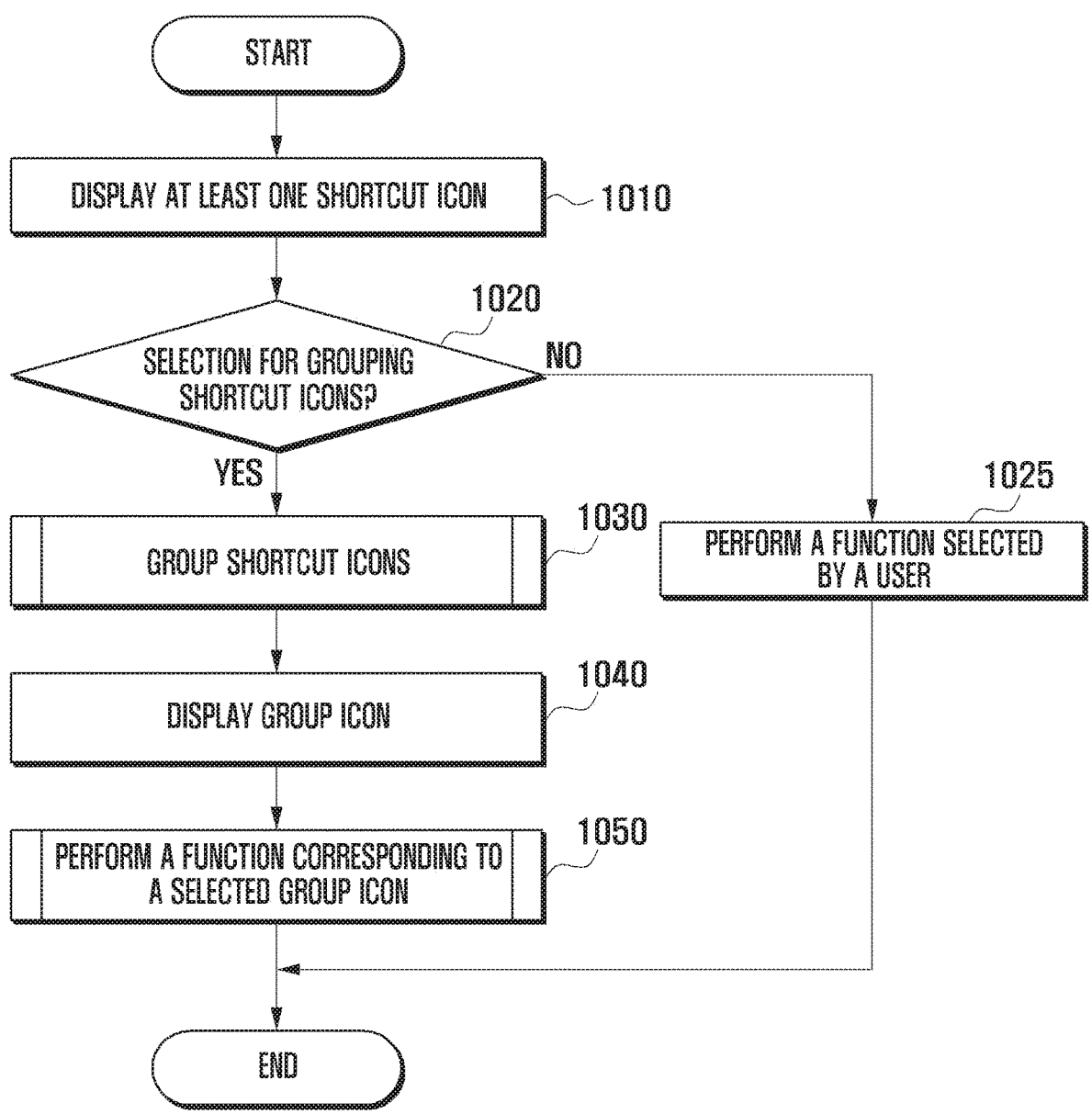
FIG. 10 shows a flowchart that describes a method for displaying a shortcut icon, according to an exemplary embodiment of the present invention.

FIG. 10 shows a flowchart that describes a method for displaying a shortcut icon, according to an exemplary embodiment of the present invention.

Referring to FIG. 10, the controller 1010 controls the display unit 735 to display at least one shortcut icon on the background screen at step 1010. The controller 1010 determines whether a shortcut icon grouping function is selected at step 1020. If the controller 710 ascertains that a shortcut icon grouping function has not selected at step 1020, it performs a function corresponding to a user's selection at step 1025.

On the contrary, if the controller 710 ascertains that a shortcut icon grouping function has been selected at step 1020, it groups at least two shortcut icons at step 1030. The shortcut icon grouping function can be selected via a menu, or alternatively, via a function key. The shortcut icon grouping process will be explained in detail with reference to FIGS. 11 and 12.

After that, the controller 710 displays the group icon of the grouped shortcut icons on the display unit 735 at step 1040. The controller 710 performs a function according to a selected group icon at step 1050, which will be explained in detail with reference to FIG. 13.

In the following description, the shortcut icon grouping process, step 1030, is explained with reference to FIGS. 11 and 12.

Figure 11:
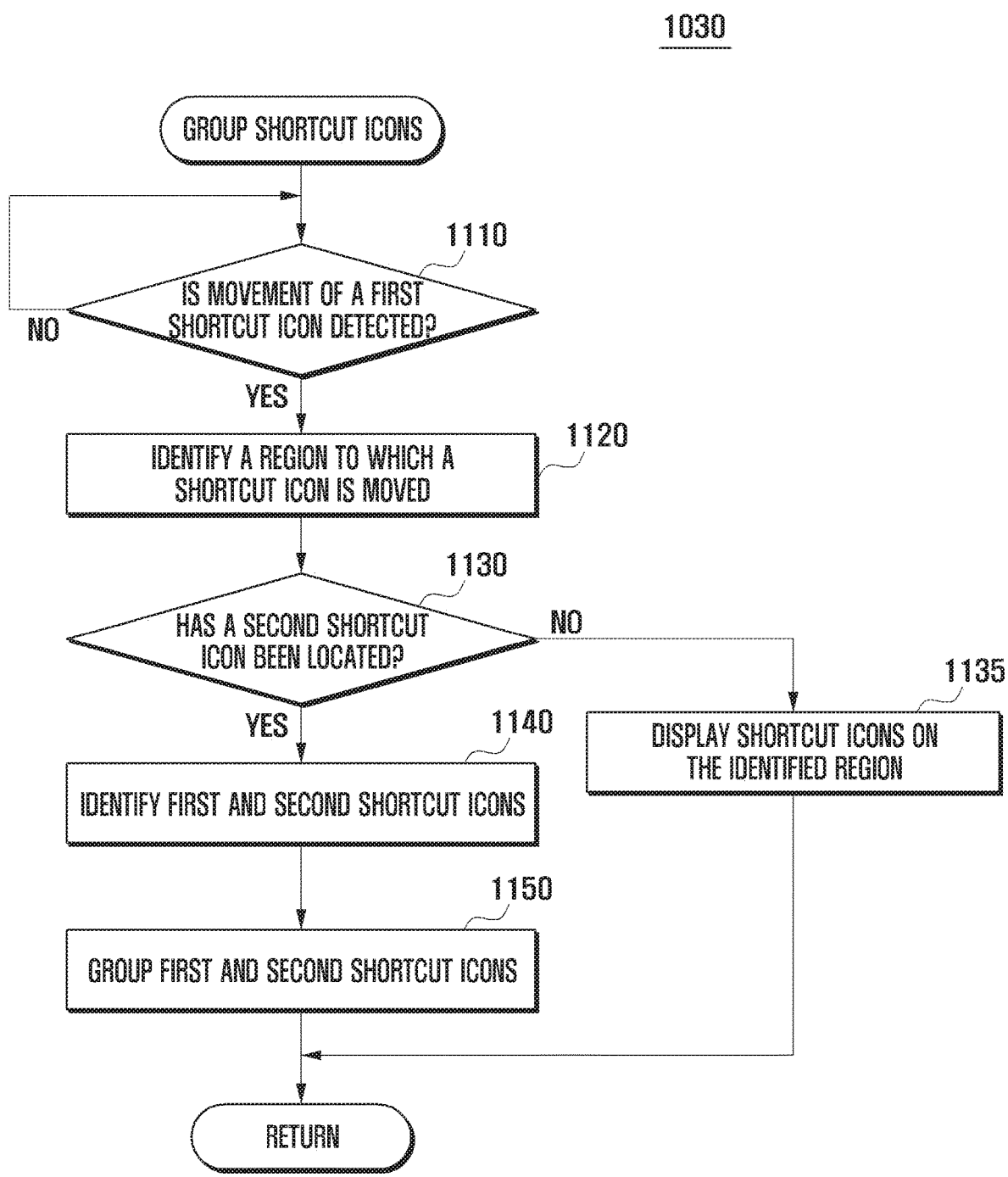
FIG. 11 shows a flowchart that describes a first a method for grouping shortcut icons according to an exemplary embodiment of the present invention.

FIG. 11 shows a flowchart that describes a first method for grouping shortcut icons according to an exemplary embodiment of the present invention.

Referring to FIG. 11, if a shortcut icon grouping function has been selected at step 1020, the controller 710 detects the movement of a first shortcut icon of the shortcut icons displayed on the display unit 735 at step 1110. After that, the controller 710 detects a region to which the first shortcut icon is moved at step 1120. If the mobile device 700 is equipped with a touch screen 730, the controller 710 can identify the region to which the first shortcut icon is moved, via a touch event detected by the touch screen 730. Alternatively, if the mobile device 700 is equipped with a key input mechanism, the controller 710 detects a user's selected shortcut icon and identifies the region to which the first shortcut icon is moved according to the user's input directional keys.

After that, the controller 710 determines whether a second shortcut icon is located in the region to which the first shortcut icon is moved at step 1130. If a second shortcut icon is not located in the region to which the first shortcut icon is moved at step 1130, the controller 710 displays the shortcut icon in the identified region at step 1135. The controller 710 updates location information about a corresponding shortcut icon, in the shortcut icon information stored in the storage unit 720, with the location information about the identified region.

On the contrary, if a second shortcut icon is located in the region to which the first shortcut icon is moved at step 1130, the controller 710 identifies information about the first and second shortcut icons at step 1140. The controller 710 groups the first and second shortcut icons at step 1150. The controller 710 shows a pop-up message stating whether the first and second shortcut icons are grouped on the display unit 735. If at least two shortcut icons are located in a certain region on the display unit 735, the controller 710 can automatically group them. Alternatively, if the user inputs a particular key, the controller 710 can also group at least two shortcut icons.

The group icon grouping method had been explained where a first shortcut icon of the shortcut icons displayed on the background screen is moved to and superimposed with a second and thus they are grouped. In the following description, a group icon grouping method is explained where at least two shortcut icons are moved to a particular region and thus they are grouped, with reference to FIG. 12.

Figure 12:
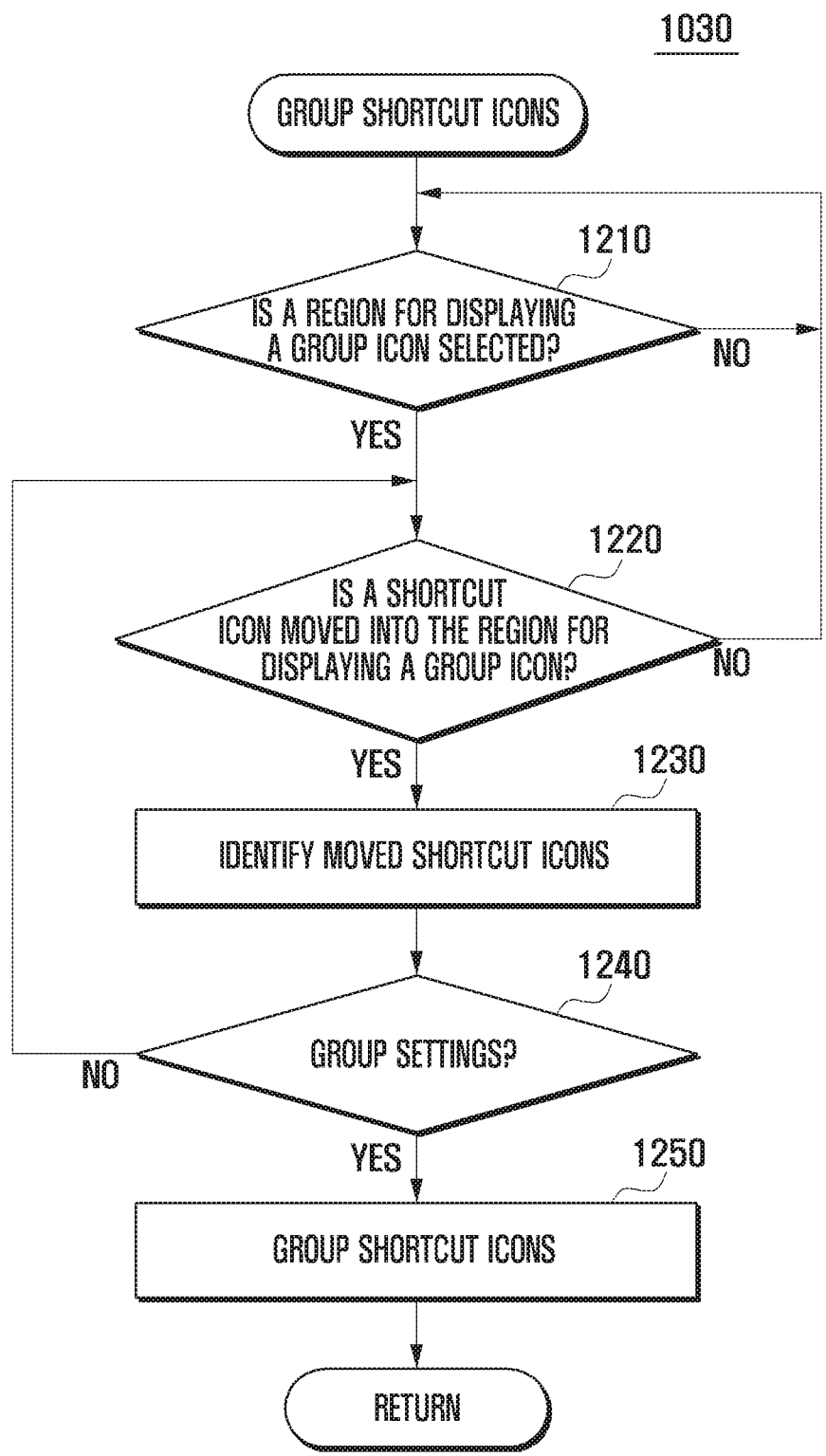
FIG. 12 shows a flowchart that describes a second method for grouping shortcut icons according to an exemplary embodiment of the present invention.

FIG. 12 shows a flowchart that describes a second method for grouping shortcut icons according to an exemplary embodiment of the present invention.

Referring to FIG. 12, if a shortcut icon grouping function has been selected at step 1020, the controller 710 determines whether a group icon display region in which a group icon will be displayed is selected at step 1210. If a group icon display region in which a group icon will be displayed has been selected at step 1210, the controller 710 determines whether one of at least one shortcut icon, displayed on the background screen, is moved to the group icon display region at step 1220.

If one of at least one shortcut icon, displayed on the background screen, is moved to the group icon display region at step 1220, the controller 710 identifies the shortcut icon moved to the group icon display region at step 1230. That is, the controller 710 identifies a function, performed according to a corresponding shortcut icon, and images used to display the shortcut icons. After that, the controller 710 determines whether a group setting is selected at step 1240. If the controller 710 ascertains that a group setting has not been selected at step 1240, it returns to and proceeds with step 1220. If these processes are repeated, a number of shortcut icons can be moved to one group icon display region.

On the contrary, if the controller 710 ascertains that a group setting has been selected at step 1240, it groups the identified shortcut icons at step 1250. The controller 710 can show a pop-up message allowing the user to optionally select a grouping function on the display unit 735. In that case, the user can identify the shortcut icons to be grouped and then select a grouping function. Alternatively, if at least two shortcut icons are located in the group icon display region, the controller 710 can automatically group them. In addition, if the user inputs a particular key, the controller 710 can also group at least two shortcut icons.

As described in FIGS. 11 and 12, the icon grouping method can group at least one shortcut icon if at least one shortcut icon is located in a particular region or in the same region with other shortcut icons. It should be understood that the present invention is not limited to the exemplary embodiment. For example, the exemplary embodiment can be modified in such a way that, if at least two shortcut icons are simultaneously selected, they can also be grouped. Through these methods, grouped shortcut icons can be displayed in a particular region on the display unit 735.

In the following description, the process of performing a function according to a selected group icon, step 1250, is explained with reference to FIG. 13.

Figure 13:
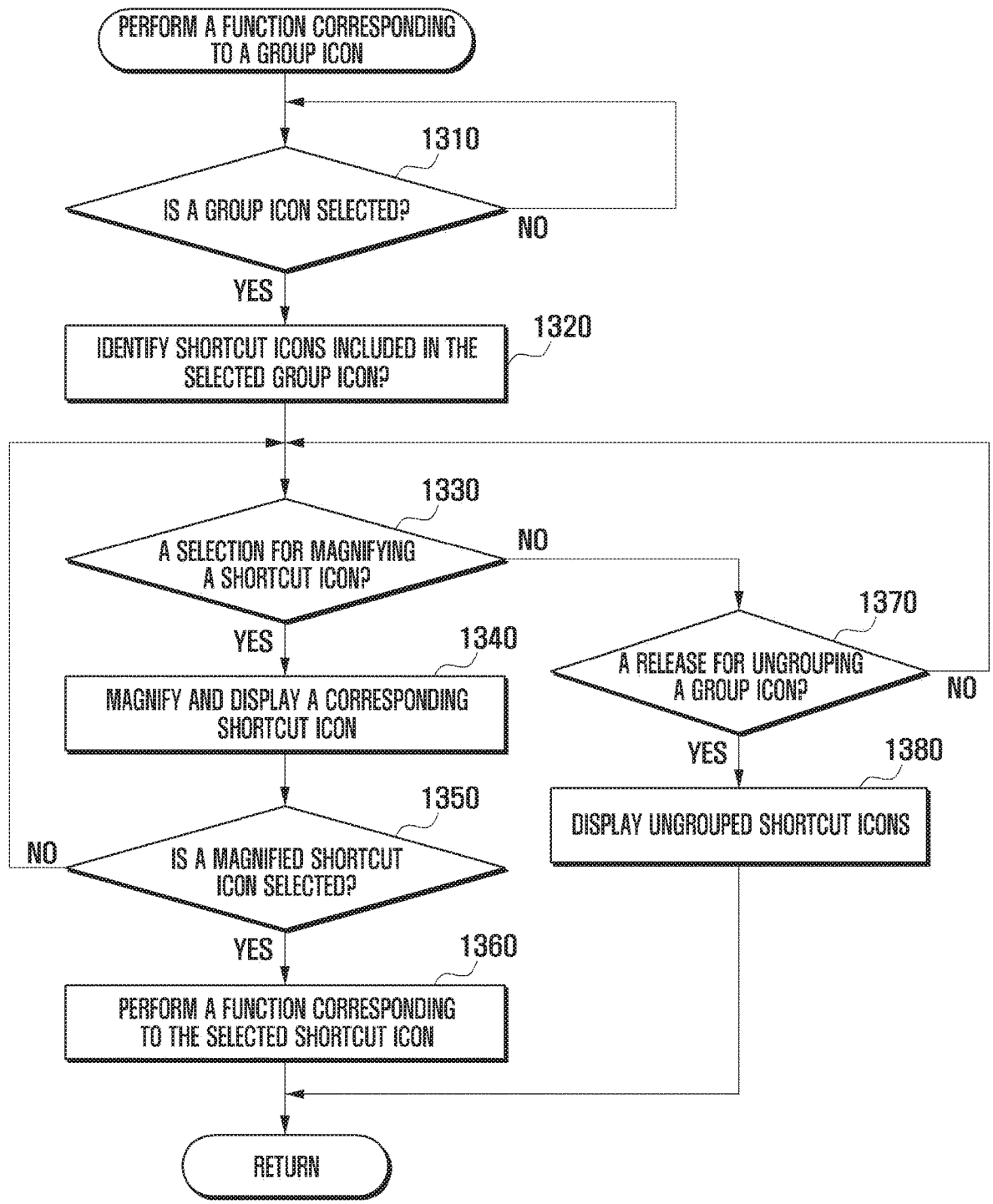
FIG. 13 shows a flowchart that describes a method for performing a function according to a group icon, according to an exemplary embodiment of the present invention.

FIG. 13 shows a flowchart that describes a method for performing a function according to a group icon, according to an exemplary embodiment of the present invention.

Referring to FIG. 13, the controller 710 determines whether at least one of the group icons is selected on the display unit 735 at step 1310. If at least one of the group icons has been selected on the display unit 735 at step 1310, the controller 710 identifies shortcut icons included in the selected group icon at step 1320. The controller 710 performs a function corresponding to one of at least two shortcut icons included in the group icon, according to a user's selection.

The controller 710 determines whether a selection is made to magnify a shortcut icon at step 1330. If a selection is made to magnify a shortcut icon at step 1330, the controller 710 magnifies and displays a corresponding shortcut icon at step 1340. For example, if a touch event occurs, once, on the group icon display region on the touch screen 730, the controller 710 magnifies and displays a first shortcut icon of the shortcut icons in the group icon greater than the remaining icons. After that, if the next touch event occurs, the controller 710 magnifies and displays a second shortcut icon greater than the remaining icons. Successively, if the next touch event occurs, the controller 710 magnifies and displays a third shortcut icon greater than the remaining icons, and so on.

Afterwards, the controller 710 determines whether the magnified shortcut icon is selected at step 1350. If the magnified shortcut icon is selected at step 1350, the controller 710 performs a function corresponding to the selected shortcut icon at step 1360. In other words, if a touch event occurs, twice, successively, on the touch screen 730 in a state where the shortcut icon is magnified, the controller 710 performs a function corresponding to the magnified shortcut icon.

On the contrary, if a selection is not made to magnify a shortcut icon at step 1330, the controller 710 determines whether a selection is made to ungroup a group icon at step 1370. If a selection is made to ungroup a group icon at step 1370, the controller 710 displays shortcut icons ungrouped from the group icon on the display unit 735 at step 1380. The controller 710 controls the display unit 735 to display the ungrouped shortcut icons on their locations before they were grouped. Determination of whether a selection is made to ungroup a group icon may be performed by the following methods. If the controller ascertains that the user has selected a group icon and detects the change in the operation of the mobile device, it concludes that a selection has been made to ungroup a group icon. Alternatively, if the controller ascertains that the user has selected a group icon and a menu or function key is operated, it can also conclude that a selection has been made to ungroup a group icon. In that case, the controller can show a pop-up message stating whether a selection is made to ungroup the group icon.

As described above, the icon grouping method can group shortcut icons on the display unit 735 in such a way if at least one shortcut icon is moved to a particular region or to a region where another shortcut icon has been displayed. After that, if the user selects one of the grouped shortcut icons in the group icon, it is magnified and displayed greater than the remaining grouped shortcut icons. In addition, the icon grouping method can group shortcut icons on the display unit 735 in such a way that the user can select at least two shortcut icons and then group them by setting a menu or an option. Furthermore, the icon grouping method can group shortcut icons on the display unit 735 in such a way that the user selects a group setting menu and then selects part of the shortcut icons, thereby grouping the selected shortcut icons.

As described above, the icon grouping method according to exemplary embodiments of the present invention allow the user to select a number of shortcut icons on the display unit and to rapidly execute a corresponding function based on the selected shortcut icons. In addition, since the icon grouping method can display a number of shortcut icons by group icons, the user can easily select a corresponding one of the grouped shortcut icons.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
   a touch screen; and
   a controller configured to:
   control the touch screen to display a group icon on which representations of a first icon and a second icon are shown, wherein the first icon associated with a first function and the second icon associated with a second function,
   receive a first touch input on the group icon,
   in response to the first touch input on the group icon, control the touch screen to display, in place of the group icon, at least one of the first icon that is larger than the representation of the first icon or the second icon that is larger than the representation of the second icon,
   receive a second touch input to at least one of the first icon and the second icon, after the displaying of the at least one of the first icon that is larger than the representation of the first icon or the second icon that is larger than the representation of the second icon, and
   in response to the second touch input, control to perform a function corresponding to the at least one of the first icon and the second icon.

2. The mobile device of claim 1, wherein the controller is further configured to:
   control the touch screen to display the first icon and the second icon, and
   receive a third touch input that is associated with grouping the first icon and the second icon, the third touch input corresponding to an input of moving the first icon so as to at least partially overlap the second icon,
   wherein the representation of the first icon is smaller than the first icon and the representation of the second icon is smaller than the second icon.

3. The mobile device of claim 1, wherein the controller is further configured to:
   receive a third touch input to at least one of the representation of the first icon and the representation of the second icon, after the displaying of the at least one of the first icon that is larger than the representation of the first icon or the second icon that is larger than the representation of the second icon, and control to ungroup at least one of the first icon and the second icon from the group icon.

4. The mobile device of claim 3, wherein the controller is further configured to display the first icon and the second icon as ungrouped relative to the group icon.

5. The mobile device of claim 4, wherein the controller is further configured to, in response to the third touch input, remove the at least one of the first icon and the second icon from the group icon.

6. The mobile device of claim 1, wherein the controller is further configured to display a graphical user interface on the touch screen indicating whether the first icon and the second icon are grouped.

7. The mobile device of claim 6, wherein the first icon and the second icon are displayed concurrently.

8. The mobile device of claim 1, wherein the controller is further configured to:
receive a third touch input associated with adding a third icon associated with a third function to the group icon, and
display, on the touch screen, the group icon on which a corresponding representation of the third icon is shown.

9. The mobile device of claim 8, wherein the representation of the third icon is smaller than the third icon.

10. The mobile device of claim 8, wherein the third touch input corresponds to at least one of moving the third icon to a preset region of the touch screen, and moving the third icon to the group icon.

11. The mobile device of claim 1, wherein the controller is further configured to:
receive a third touch input that is associated with setting the mobile device to an icon grouping mode, and
set the mobile device to the icon grouping mode in response to the third touch input.

12. A method of displaying an icon in a mobile terminal comprising a touch screen, the method comprising:
controlling the touch screen to display a group icon on which representations of a first icon and a second icon are shown;
receiving a first touch input on the group icon, in response to the first touch input on the group icon, controlling the touch screen to display, in place of the group icon, at least one of the first icon that is larger than the representation of the first icon or the second icon that is larger than the representation of the second icon;
receiving a second touch input to at least one of the first icon and the second icon, after the displaying of the at least one of the first icon that is larger than the representation of the first icon or the second icon that is larger than the representation of the second icon; and
in response to the second touch input, controlling to perform a function corresponding to the at least one of the first icon and the second icon.

13. The method of claim 12, further comprising:
controlling the touch screen to display the first icon and the second icon; and
receiving a third touch input that is associated with grouping the first icon and the second icon, the third touch input corresponding to an input of moving the first icon so as to at least partially overlap the second icon,
wherein the representation of the first icon is smaller than the first icon and the representation of the second icon is smaller than the second icon.

14. The method of claim 12, further comprising:
receiving a third touch input to at least one of the representation of the first icon and the representation of the second icon, after the displaying of the at least one of the first icon that is larger than the representation of the first icon or the second icon that is larger than the representation of the second icon; and
controlling to ungroup at least one of the first icon and the second icon from the group icon.

15. The method of claim 14, further comprising:
displaying the first icon and the second icon as ungrouped relative to the group icon.

16. The method of claim 15, further comprising:
in response to the third touch input, removing the at least one of the first icon and the second icon from the group icon.

17. The method of claim 12, further comprising:
displaying a graphical user interface on the touch screen indicating whether the first icon and the second icon are grouped.

18. The method of claim 17, wherein the first icon and the second icon are displayed concurrently.

19. The method of claim 12, further comprising:
receiving a third touch input associated with adding a third icon associated with a third function to the group icon; and
displaying, on the touch screen, the group icon on which a corresponding representation of the third icon is shown.

20. The method of claim 19, wherein the representation of the third icon is smaller than the third icon.

21. The method of claim 19, wherein the third touch input corresponds to at least one of moving the third icon to a preset region of the touch screen, and moving the third icon to the group icon.

22. The method of claim 12, further comprising:
receiving a third touch input that is associated with setting the mobile terminal to an icon grouping mode; and
setting the mobile terminal to the icon grouping mode in response to the third touch input.

* * * * *